(12) United States Patent
Zinn et al.

(10) Patent No.: US 8,000,747 B2
(45) Date of Patent: Aug. 16, 2011

(54) COMMUNICATIONS DEVICE AND METHOD FOR ASSOCIATING CONTACT NAMES WITH CONTACT METHODS

(75) Inventors: Ronald Scotte Zinn, Waterloo (CA); Mihal Lazaridis, Waterloo (CA); Andrew D. Bocking, Waterloo (CA)

(73) Assignee: Research In Motion Limited, Waterloo (CA)

( * ) Notice: Subject to any disclaimer, the term of this patent is extended or adjusted under 35 U.S.C. 154(b) by 1092 days.

(21) Appl. No.: 11/278,479

(22) Filed: Apr. 3, 2006

(65) Prior Publication Data

US 2007/0264977 A1 Nov. 15, 2007

(51) Int. Cl.
*H04B 1/38* (2006.01)
(52) U.S. Cl. ........................................ 455/566; 455/415
(58) Field of Classification Search .................. 455/564, 455/566
See application file for complete search history.

(56) References Cited

U.S. PATENT DOCUMENTS

| 6,959,207 B2 * | 10/2005 | Keinonen et al. | 455/567 |
| 2002/0082054 A1 | 6/2002 | Keinonen et al. | |
| 2003/0195018 A1 * | 10/2003 | Lee | 455/566 |

OTHER PUBLICATIONS

Canadian Office Action dated Mar. 12, 2010, issued from CA Patent Application No. 2,541,620; pp. 1-4.

* cited by examiner

*Primary Examiner* — Simon Sing
(74) *Attorney, Agent, or Firm* — Ridout & Maybee LLP (57) ABSTRACT

A method for selecting a communication option for communications from a mobile device which operates in a wireless communication network, the mobile device having access to stored address book information that includes contact names, the method including: storing for at least some of the contact names an indication of a last communication option used for communicating therewith; displaying a list of user selectable contact names on a display of the mobile device; after receiving user input selecting of one of the contact names from the list, causing a list of user selectable communication options for communicating with the selected contact name to be generated on the display; and automatically positioning a selection symbol on the display to highlight the selectable communication option that corresponds to a last communication option that was used for communicating with the selected contact name.

15 Claims, 7 Drawing Sheets

COMMUNICATIONS DEVICE AND METHOD FOR ASSOCIATING CONTACT NAMES WITH CONTACT METHODS

FIELD

Example embodiments described herein relate to communications devices and, in particular, to methods and systems for associating and highlighting contact names with contact methods on such devices.

BACKGROUND

Communications devices, in particular handheld mobile communications devices, are becoming increasingly sophisticated. Such a device allows a user to contact a second user or device through a communication network through various contact methods.

Accordingly, there are numerous contact methods for the user to contact the second user or device. For instance, the user may choose to e-mail, phone, Short Message Service (SMS), or fax the second user or device. Another contact method is known as Personal Identification Number (PIN) communication. PIN communication is different from and often considered to be more private than sending messages between email accounts. PIN messages are sent directly from one device to another without going through a central corporate server. Instead, the messages are sent through a non-corporate server such as a telecommunications provider and directly to the other device. In order for a user to choose the contact method, the user may be required to scroll through a menu using a scrollwheel or keyboard to select the appropriate contact method.

Once a user has finished contacting the second user or device using a contact method, the user may wish to contact the second user or device again using the same contact method. For example, a user may email a second user by scrolling through a menu to choose the appropriate contact method, in this case the "email" field is chosen. If the user wishes to contact the second user again through a new email, the user would have to once again scroll through a menu to select the email as the appropriate contact method. The scrolling may waste valuable time, as is the case when the user continually contacts the second user using the same contact method.

BRIEF DESCRIPTION OF THE DRAWINGS

Example embodiments will now be described by way of example with reference to the accompanying drawings, through which like reference numerals are used to indicate similar features.

DETAILED DESCRIPTION

According to example embodiments, there is provided a method for selecting a communication option for communications from a mobile device which operates in a wireless communication network, the mobile device having access to stored address book information that includes contact names, the method including: storing for at least some of the contact names an indication of a last communication option used for communicating therewith; displaying a list of user selectable contact names on a display of the mobile device; after receiving user input selecting of one of the contact names from the list, causing a list of user selectable communication options for communicating with the selected contact name to be generated on the display; and automatically positioning a selection symbol on the display to highlight the selectable communication option that corresponds to a last communication option that was used for communicating with the selected contact name.

According to example embodiments, there is provided a mobile device including a controller including at least one processor, a wireless transceiver coupled to the controller for exchanging signals with a wireless communications network, a user input interface coupled to the controller for receiving user input, a storage coupled to the controller and storing address book information identifying contact names and associated address information for the contact names, and a display coupled to the controller. The controller is operative to: store for at least some of the contact names an indication of a last communication option used for communicating therewith; display a list of user selectable contact names on the display; and after selection of one of the contact names from the list by a device user through the user input interface, cause (i) a list of user selectable communication options for communicating with the selected contact name to be generated on the display, and (ii) a selection symbol to be positioned on the display to highlight the selectable communication option that corresponds to a communication option that was last used for communicating with the selected contact name.

According to further example embodiments, there is provided a method for selecting a communication method for a mobile device which operates in a wireless communication network, the mobile device having access to stored address book information that includes contact names. The method includes: storing for at least some of the contact names an indication of a last communication option used for communicating therewith; causing a list of user selectable functions to be generated on the display for a selected one of the contact names, the list including a plurality of selectable communication functions each corresponding to a different communication option for communicating with the selected contact name; and automatically positioning a selection symbol on the display to highlight the communication function that corresponds to the communication option that was last used for communicating with the selected contact name.

The following description of one or more specific embodiments does not limit the implementation of the invention to any particular computer programming language, operating system, system architecture or device architecture. Moreover, although some embodiments may include mobile devices, not all embodiments are limited to mobile devices; rather, various embodiments may be implemented within a variety of communications devices or terminals, including handheld devices, mobile telephones, personal digital assistants (PDAs), personal computers, audio-visual terminals, televisions, and other devices.

Figure 1:
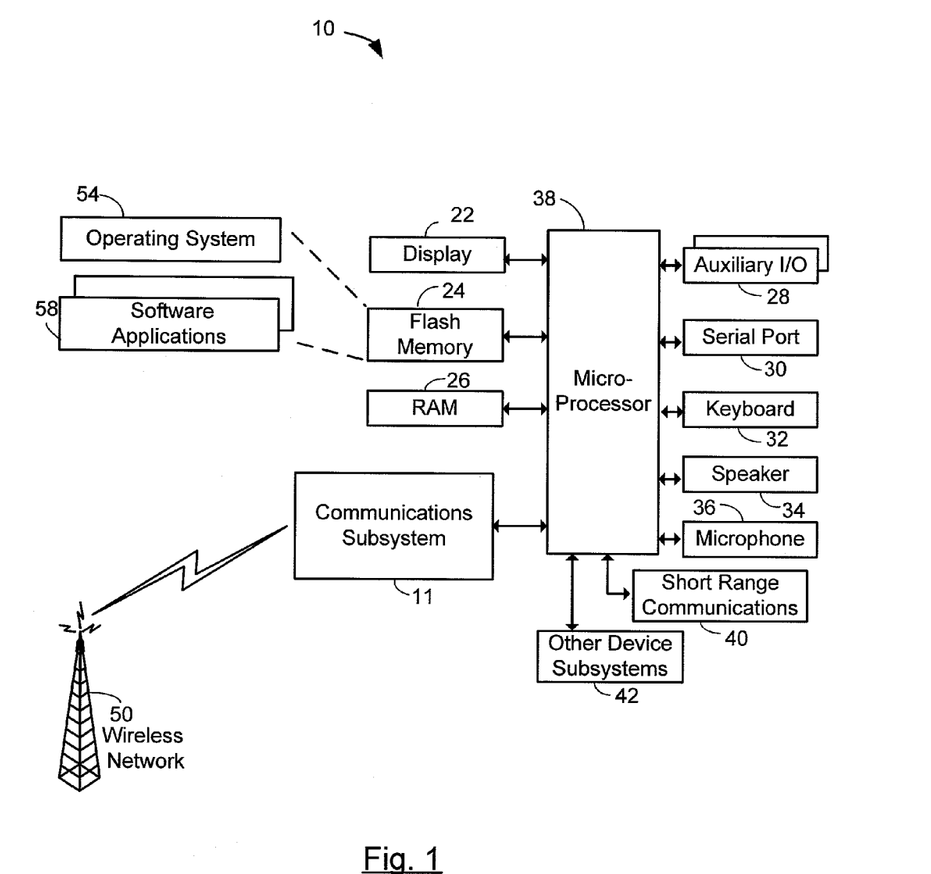
FIG. 1 shows a block diagram of an example of a mobile communications device to which example embodiments of an associating and highlighting module can be applied.
Figure 2:
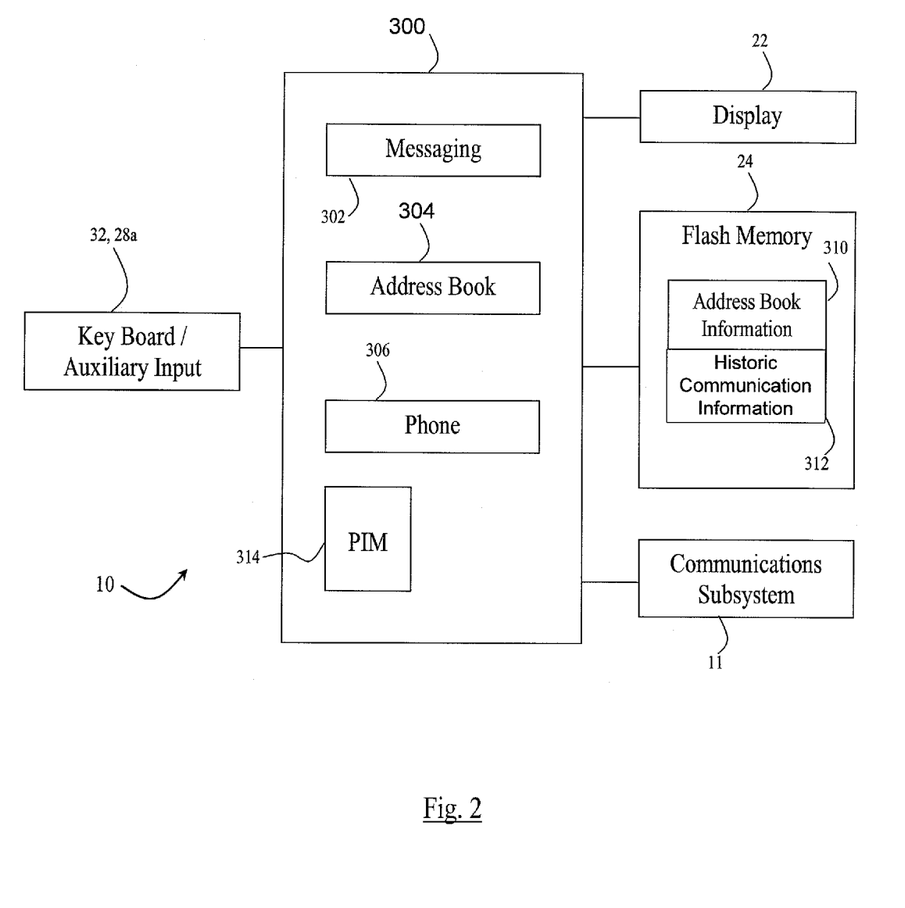
FIG. 2 shows a further operational block diagram representation of the mobile communications device of FIG. 1.

Referring now to the drawings, FIG. 1 is a block diagram showing an example of an electronic communications device 10 to which example embodiments of the associating and highlighting module described herein can be applied. The communications device 10 is a two-way mobile communication device having voice and messaging communications capabilities. Depending on the functionality provided by the device 10, in various embodiments the device 10 may be a data communication device, a multiple-mode communication device configured for both data and voice communication, a mobile telephone, a PDA enabled for wireless communication, a computer system with a wireless modem or wireless network card, or a computer or phone device with a fixed connection to a network, among other things. The device 10 is in at least one example embodiment a handheld device having a case that is dimensioned to fit into a purse, pocket or belt-mounted device holster.

In the example embodiment shown in FIG. 1, the device 10 includes a communication subsystem 11 acting as the interface between the device 10 and the wireless communications network 50. The communication subsystem 11 may include one or more receivers, transmitters, and associated components such as one or more antenna elements, and a processing module such as a digital signal processor (DSP). As will be apparent to those skilled in the field of communications, the particular design of the communication subsystem 11 will be dependent upon the communication network(s) in which the device 10 is intended to operate.

The device 10 includes a controller that includes at least one microprocessor 38 that controls the overall operation of the device. The microprocessor 38 interacts with the communications subsystem 11 and also interacts with further device subsystems such as a display 22, flash memory 24, random access memory (RAM) 26, one or more auxiliary input/output (I/O) subsystems or devices 28 (e.g. a scrollwheel 28a), serial port 30, keyboard or keypad 32, speaker 34, microphone 36, a short-range communications subsystem 40, and any other device subsystems generally designated as 42.

Figure 3:
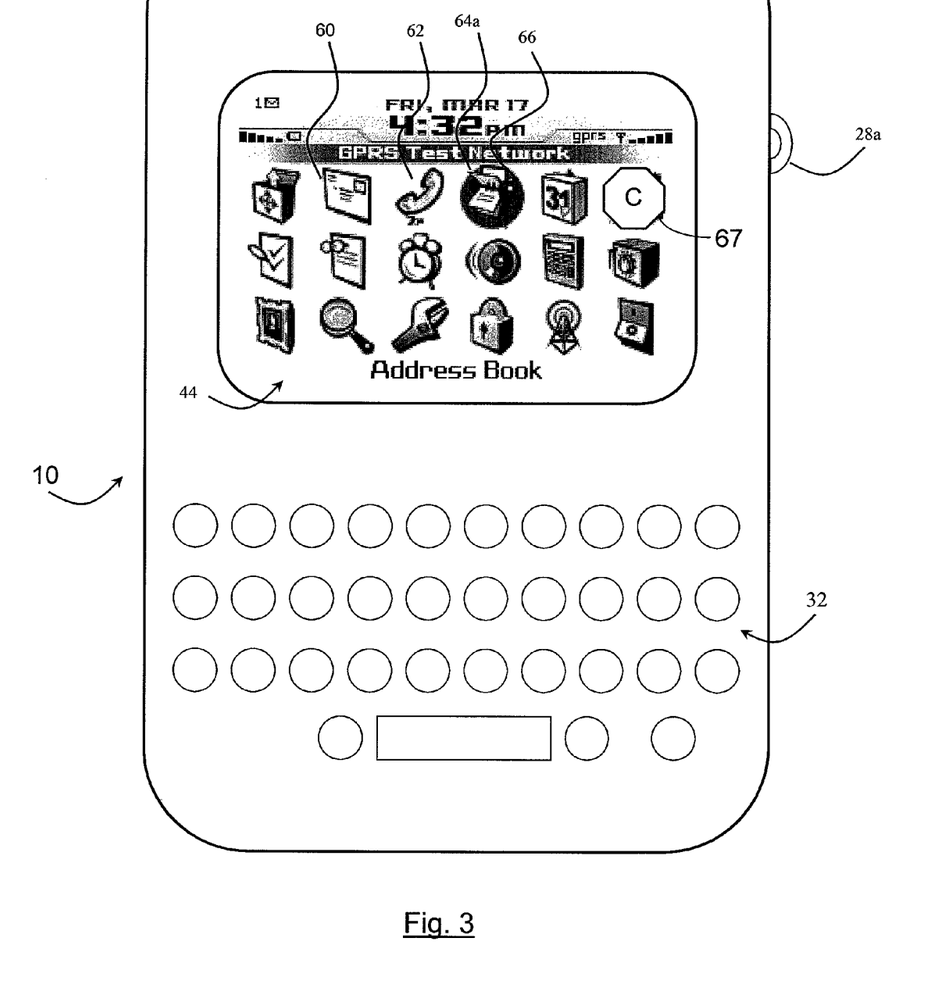
FIG. 3 shows, in diagrammatic form, a front view of an example of the device of FIG. 1.

FIG. 3 shows, in diagrammatic form, a front view of an example handheld embodiment of the device 10 of FIG. 1. The device 10 includes a display screen 44 of the display 22, alphanumeric keyboard or keypad 32 and scrollwheel 28a.

Referring again to FIG. 1, operating system software 54 and various software applications 58 used by the microprocessor 38 are, in one example embodiment, stored in a persistent store such as flash memory 24 or similar storage element. Those skilled in the art will appreciate that the operating system 54, software applications 58, or parts thereof, may be temporarily loaded into a volatile store such as RAM 26. It is contemplated that received communication signals may also be stored to RAM 26.

The microprocessor 38, in addition to its operating system functions, in example embodiments enables execution of software applications 58 on the device. A predetermined set of software applications 58 which control basic device operations, including data and voice communication applications for example, will normally be installed on the device 10 during manufacture. Further software applications 58 may also be loaded onto the device 10 through the wireless communication network 50, an auxiliary I/O subsystem 28, serial port 30, short-range communications subsystem 40 or any other suitable subsystem 42, and installed by a user in the RAM 26 or a non-volatile store for execution by the microprocessor 38. Such flexibility in application installation increases the functionality of the device and may provide enhanced on-device functions, communication-related functions, or both. For example, secure communication applications may enable electronic commerce functions and other such financial transactions to be performed using the device 10.

In a data communication mode, a received signal such as a text message or web page download will be processed by the communication subsystem 11 and input to the microprocessor 38, which further process the received signal for output to the display 22 through the graphics subsystem 44, or alternatively to an auxiliary I/O device 28. A user of device 10 may also compose data items within a software application 58, such as email messages and calendar entries for example, using the keyboard 32 in conjunction with the display 22 and possibly an auxiliary I/O device 28 (e.g. the scrollwheel 28a). Such composed items may then be transmitted and received over a communication network through the communication subsystem 11.

The serial port 30 (which may be for example a universal serial bus (USB) port) in FIG. 1 may enable a user to set preferences through an external device or software application and would extend the capabilities of the device by providing for information or software downloads to the device 10 other than through a wireless communication network.

The short-range communications subsystem 40 is a further component which may provide for communication between the device 10 and different systems or devices, which need not necessarily be similar devices. For example, the subsystem 40 may include an infrared device and associated circuits and components or a Bluetooth T communication module to provide for communication with similarly enabled systems and devices.

Wireless communication network 50 is, in an example embodiment, a wireless wide area packet data network, which provides radio coverage to mobile devices 10. Wireless communication network 50 may also be a voice and data network such as GSM (Global System for Mobile Communication) and GPRS (General Packet Radio System), CDMA (Code Division Multiple Access), or various other third generation networks such as EDGE (Enhanced Data rates for GSM Evolution) or UMTS (Universal Mobile Telecommunications Systems). In some example embodiments, network 50 is a wireless local area network (WLAN), such as for example a network compliant with one or more of the IEEE 802.11 family of standards. In some example embodiments, the device 10 is configured to communicate in both data and voice modes over both wireless WAN and WLAN networks and to roam between such networks.

Also stored in a persistent storage of the device such as flash memory 24 is address book information 310 and associated historic communication information 312. Such information may also be at least partially stored at least some of the time in memory of a SIM card used with the device, in volatile device memory, and/or at a location accessible to the device 10 over network 50.

Under instructions from various software applications 58 resident on the device 10, the processor 38 is configured to implement various functional components or modules 300, some of which are represented in FIG. 3, for interacting with the device subsystems described above. In an example embodiment, the software resident on the device 10 includes applications for implementing an address book 304, a telephone 306, and electronic messaging 302, and personal information management 314 (PIM). In some embodiments, some or part of the functionality of the functional modules 300 can be implemented through firmware or hardware components instead of, or in combination with, computer software instructions executed by the microprocessor 38 (or other processors).

The electronic messaging module 302 enables the device 10 to send and receive messages, such as email messages, over one or more wireless networks 50. Examples of electronic messaging include email, PIN and/or SMS.

The address book 304 enables address book information 310, such as telephone numbers, PIN numbers, and email and/or instant text messaging addresses, to be stored and accessed on the device 10. The telephone module 306 enables the device 10 to transmit and receive voice and data over one or more wireless networks 50.

The PIM 314 enables the device 10 to organize the personal information and applications of the user, including the address book 304. The PIM 314 is often used to synchronize between the device 10 and another application, such as a desktop email client application. The PIM 314 may also enable the device 10 to store an association between a contact name and a contact method in the historic communications information 312. In some embodiments, some or all of the functionality of the messaging, address book and phone applications could be incorporated into the PIM module 314. In the presently described embodiment, the microprocessor 38 is configured through one or more of the applications and modules described above to implement the user interface methods and procedures described below.

FIG. 3 shows, in diagrammatic form, an example of handheld communications device 10 on which a plurality of user selectable icons are shown on a display screen 44 of device display 22. The icons are each associated with functions that can be performed by the device 10. For example, FIG. 3 shows a "Messages" icon 60 for accessing electronic messaging functions of the device (associated with electronic messaging module 302), a "Phone" icon 62 for accessing phone functionality (associated with telephone module 306), and an "Address Book" icon 64a for accessing address book functions (associated with address book module 304). As shown, the icon 64a is highlighted or focused by a caret or selection symbol 66 which can be navigated by a device user among the displayed icons through rotation of the scrollwheel 28a (or other navigational input device). The scrollwheel 28a is also depressible, such that depression of the scrollwheel 28a when an icon is highlighted or focused by selection symbol 66 results in launching of the underlying function.

Figure 4:
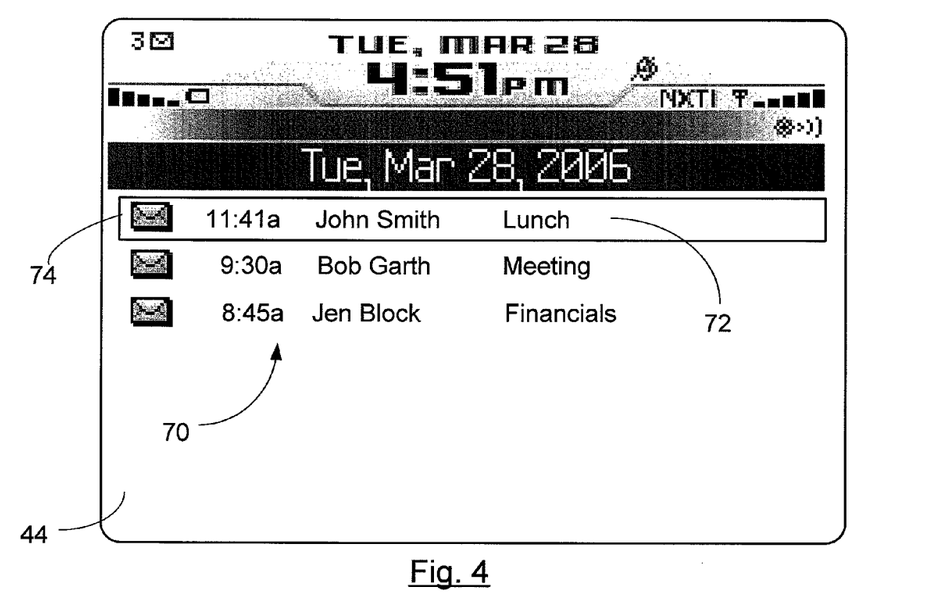
FIG. 4 shows an example of a messages list user interface screen shown on a display of the device.

According to example embodiments, the device 10 is configured to track the communication option (for example, email, SMS, PIN or phone) last used by the device to contact a specific contact, and then allow the device user to easily select that communication option the next time the device user uses the device to communicate with that specific contact. By way of example, FIG. 4 shows an example of a user interface screen 44 of the device 10 in the situation where the user has selected the "Messages" icon 60 from FIG. 3. In response to user selection of the "Messages" icon 60, a message list 70 identifying the electronic messages 70 that are available for viewing on the device 10 is presented on the display screen 44. For each message item in the list 70, a status icon (for example a closed or open envelope), a time stamp (for example "11:41a" for message item 72), a sender or receiver name ("John Smith" for item 72) and a message subject line ("Lunch") are displayed. The device user can scroll through the messages and highlight a message of interest with a selection indicator 74 using scrollwheel 28a or other navigational input, and depressing the scrollwheel 28a can open a highlighted message item for viewing on the screen 44.

Figure 5:
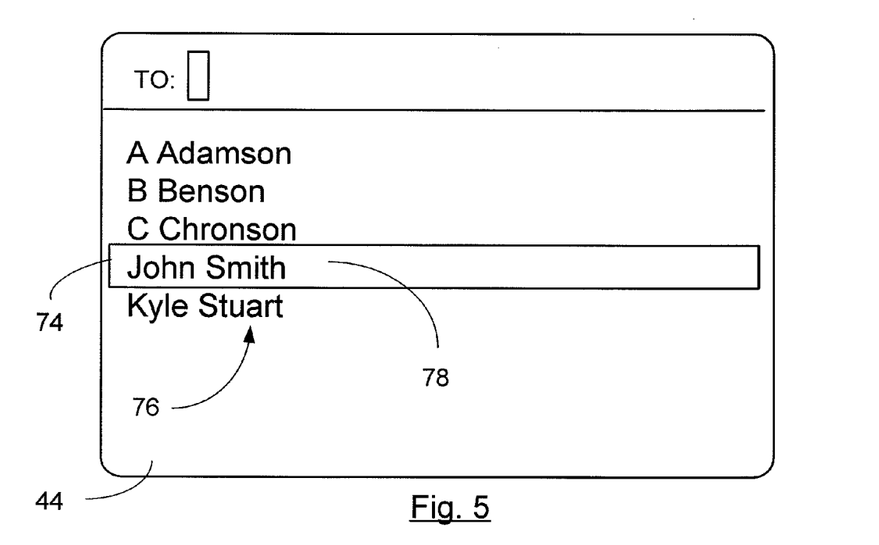
FIG. 5 shows an example of an address list user interface screen shown on a display of the device.

In an example embodiment, when a specific message item (such as item 72 for example) in the message list 70 is highlighted by the selection indicator 74 and the device user presses a predetermined "hot" key, for example a "C" key on keyboard 32, the address book function of the device 10 is launched and, as shown in FIG. 5, an address list 76 of names having corresponding entries in the address book information 310 is displayed on display screen 44. In the user interface screen shown in FIG. 5, a device user can scroll through the displayed names of the address list 76 using scrollwheel 28a or other navigational input. In the illustrated example, when the address list 76 is launched by using a hot key (ex. "C" key) from a message list interface screen such as shown in FIG. 4 where a message 72 associated with a specific sender or recipient ("John Smith") is highlighted, then the address list 76 is automatically initially displayed as shown in FIG. 5 with the selection indicator 74 located over the name ("John Smith") of that specific contact in the address list 76 (in the case where the specific party has an entry in the address book information 310).

The contact names in the address list 76 each have associated entry in the address book information 310 that is stored at or accessible to the device 10. The address book entry for each contact name can include all or parts of the following for the named contact: last name; first name; email address; company name; company address; job title; work phone number (work); alternative work phone number (work 2); home phone number; mobile number; pager number; fax number; PIN address; etc. In some cases, the contact name may have multiple email addresses associated with it, multiple PIN addresses, multiple mobile phone numbers, etc. Additionally, historic communication information 312 that identifies the communication method or option that was last used to contact an address book entry is part of or is linked to at least some of the address book entries. In example embodiments, the historic communication information 312 that is associated with a contact name may specify whether the last contact was by voice phone or through electronic messaging, and in the case of electronic messaging may specify the communication method used for the last electronic message sent to the associated contact (for example email, text message (SMS), instant messaging, fax, and/or PIN messaging). Where a contact name has multiple address options for some or all of the various communications methods (for example multiple email addresses, multiple PIN addressees, and or multiple phone numbers), then the historic communication information 312 identifies the last address that was used for communicating with the contact name. In cases where a contact entry in the address book has not yet been contacted, a default communication option may be initially assigned such as "email" for example.

Figure 6:
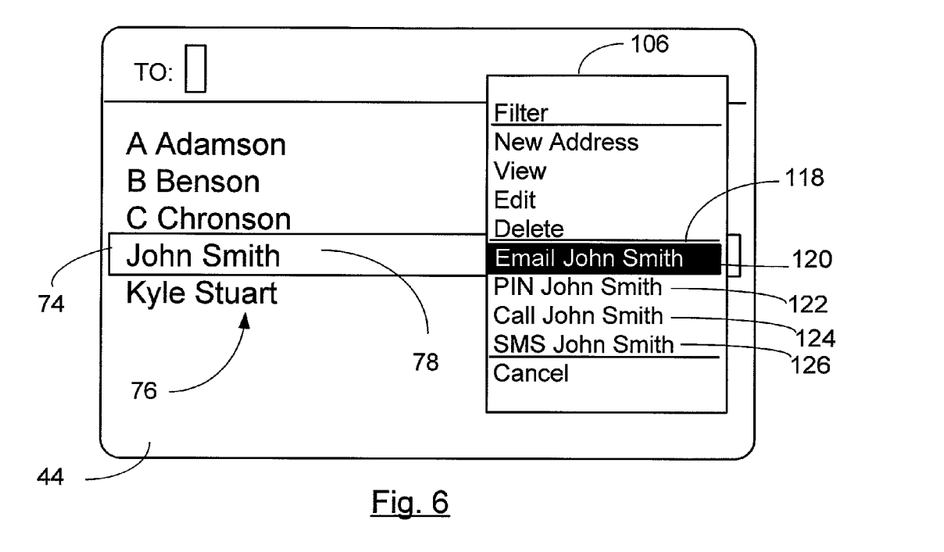
FIG. 6 shows an example of an address list user interface screen shown on a display of the device, together with an options menu.

Referring now to FIGS. 5 and 6, when a specific contact name (ex. "John Smith") is highlighted in the address list 76 and the device user selects the highlighted name by depressing the scrollwheel 28a (or other predetermined input key), an options list or menu 106 of selectable functions that may be performed by the device 10 in respect of the highlighted name is displayed on the display screen 44 (see FIG. 6). In the illustrated embodiment, the options menu 106 includes a number of communication function options for initiating contact with the highlighted name, including, for example an "Email" function 120; a "PIN function" 122; a "Call" function 124; and an text messaging "SMS" function 126. In some cases, multiple function options for the same type of transport method could be displayed—for example "Email to address No.1"; "Email to address No.2", etc. A selection indicator 118 can be scrolled through the options menu 106 (by rotating scrollwheel 28a, for example) to selectively highlight the functions that are presented in the options menu 106. In the presently described embodiment, when generating the options menu 106 for a highlighted contact name, the processor 32 checks the historic communication information 312 associated with the highlighted name to determine the communication option that was last used when contacting that name, and automatically positions the selection indicator 118 to highlight the communication function in options menu 106 that corresponds to the last used communication option. For example, in the embodiment shown in FIG. 6, the last time "John Smith" was contacted through the device 10 email was used, and thus when the options menu 106 is generated, the selectable function "Email John Smith" 120 is automatically highlighted with selection indicator 118. In order to select the highlighted function, the device user depresses the scrollwheel 28a (or in some embodiments, presses another predetermined input key). Alternatively, if desired the device user can rotate and then depress the scrollwheel 28a (or use an alternative navigational input and selection mechanism, depending on the device 10) to highlight and then select an alternative communication function from the option list 106.

Figure 7:
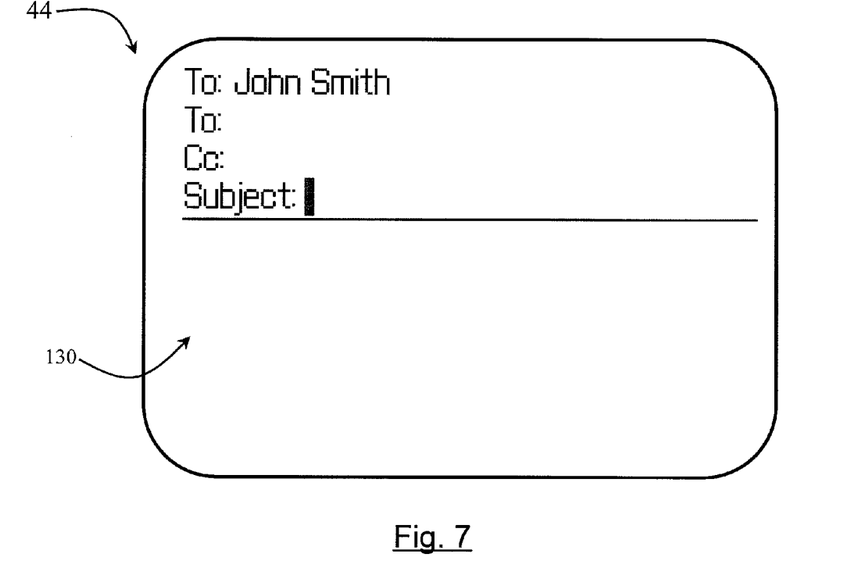
FIG. 7 shows a diagrammatic view of an electronic mail message graphical user interface screen.

Assuming that the user chooses to select the highlighted "Email John Smith" function 120 by depressing the scrollwheel 28a, a compose email user interface 130 as shown in FIG. 7 will be displayed on display screen 44 with the target recipient address field automatically populated with the highlighted contact's information, assisting the device user with composing and sending an email to the contact.

Figure 8:
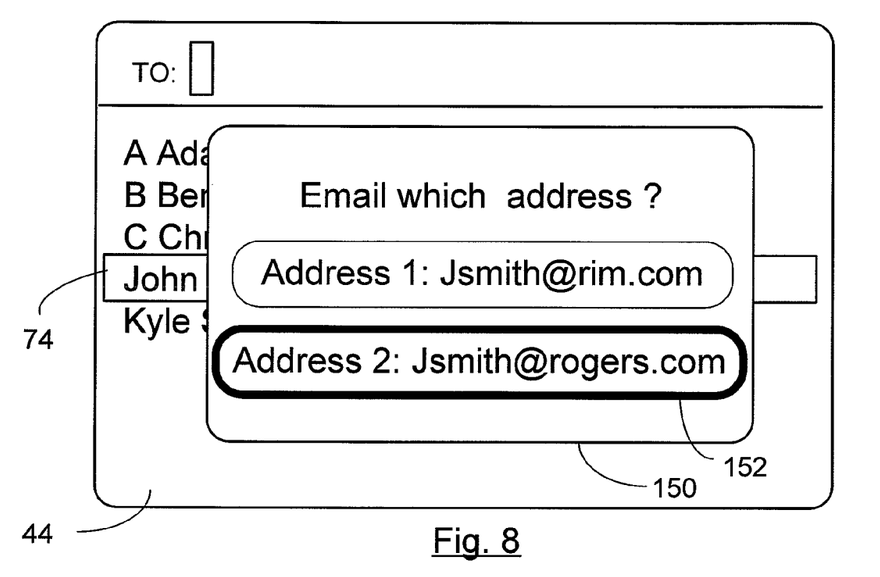
FIG. 8 shows a diagrammatic view of a menu with an email address option field highlighted.

As indicated above, in some circumstances a selected contact will have multiple associated email addresses. In one example embodiment, the different email address options are presented as different selectable options in option menu 106, for example "Email1 John Smith"; "Email2 John Smith", the last used email address is by default highlighted with selection indicator 118, and selection of the highlighted email option results in generation of the email compose interface of FIG. 7 with the appropriate email address. In alternative embodiments, where multiple email address options exist, only a single "Email Contact Name" option 120 will appear in the options menu 106, and user selection of the email option causes a further email option user interface window 150 to be generated on the display screen 44, as shown in FIG. 8. In the illustrated example, the email options window 150 displays, based on the stored contact information for John Smith in the address book information 310, two different email address options. A device user can, through rotation of scrollwheel 28a (or other suitable navigational input) move a selection symbol 152 through the address options to selectively highlight one of the options so that it can then be selected by depressing the scrollwheel 28a (or pressing another suitable option selection key) to cause the device 10 to generate a compose email interface 130 (FIG. 7) for sending an email to the selected address. In example embodiments, when the email address option window 150 is generated in respect of a highlighted contact name, a check of the stored communication information 312 for the contact is performed to determine what email address are known for the contact and of those addresses, which was the last one that was used for emailing the contact. The known addresses are then presented as options in the window 150, and the selection symbol 152 is automatically positioned to highlight the last used email address for the named contact.

Figure 9:
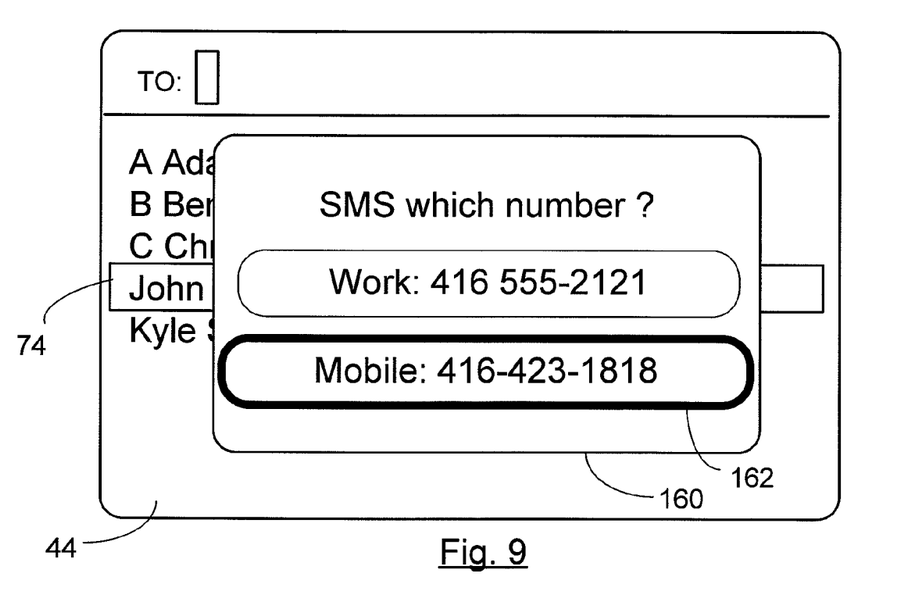
FIG. 9 shows a diagrammatic view of a menu with an SMS address option field highlighted.

Referring again to FIG. 6, in the event that the last known transport method used for contacting "John Smith" had been PIN messaging, then the "PIN John Smith" function 122 would have been highlighted by selection indicator 118 when options menu 106 was generated, and selection of the highlighted function would result in an interface screen for composing a PIN message to John Smith's PIN address (as stored in address book information 31) being generated on display screen 44. In the event that multiple PIN addresses existed for the contact name, then a PIN address selection window similar to that shown FIG. 8 can be generated to permit the user to select the appropriate PIN address (with the last used PIN address being highlighted by default In the event that the last known transport method used for contacting "John Smith" had been text messaging through, for example SMS communications, then the "SMS John Smith" function 126 would have been highlighted by selection indicator 118 when options menu 106 was generated, and selection of the highlighted function would result in an interface screen for composing an SMS message to John Smith's SMS address (as stored in address book information 31) being generated on display screen 44. Again, in some circumstances there may be multiple phone numbers associated with a contact name that could be used to SMS text message the contact name. In example embodiments, when multiple SMS addresses for a contact name exist and the user selects the "SMS option" 126 from options menu 106 an SMS address option dialog window 160 is generated listing the available SMS addresses (which are typically telephone numbers) as selectable options (See FIG. 9). The SMS address option window functions in a manner similar to the email address option widow 150 discusses above, with the telephone number last used to SMS message the contact name being highlighted by default with a selection indicator 162. In the event that the is not a last used number on record for the named contact, the slection indicator 162 by default will highlight the first mobile phone number on record for the named contact (as SMS messages are more typically sent to mobile devices than to stationary phones).

In the event that the last known transport method for communicating with the contact is through phone communications, then the "Call John Smith" telephone function 124 would have been highlighted by selection indicator 118 when options menu 106 was generated. In one example embodiment, once a user selects a highlighted "telephone call" function 224, the processor 38 immediately initiates a telephone call from the device and through the communications network to the telephone number stored in the address information for the contact. In some embodiments, a confirmation screen may be presented requesting the device user to confirm that the call is to be initiated. Often the address book entry for a particular contact will have more than one telephone possible number associated with that contact, including for example one or more work numbers, a cell number, and/or a pager number. Thus, as suggested above, in at least some example embodiments, the device 10 is configured to track in the historic communication information 312 the telephone number last used when initiating telephone contact with a contact.

Figure 10:
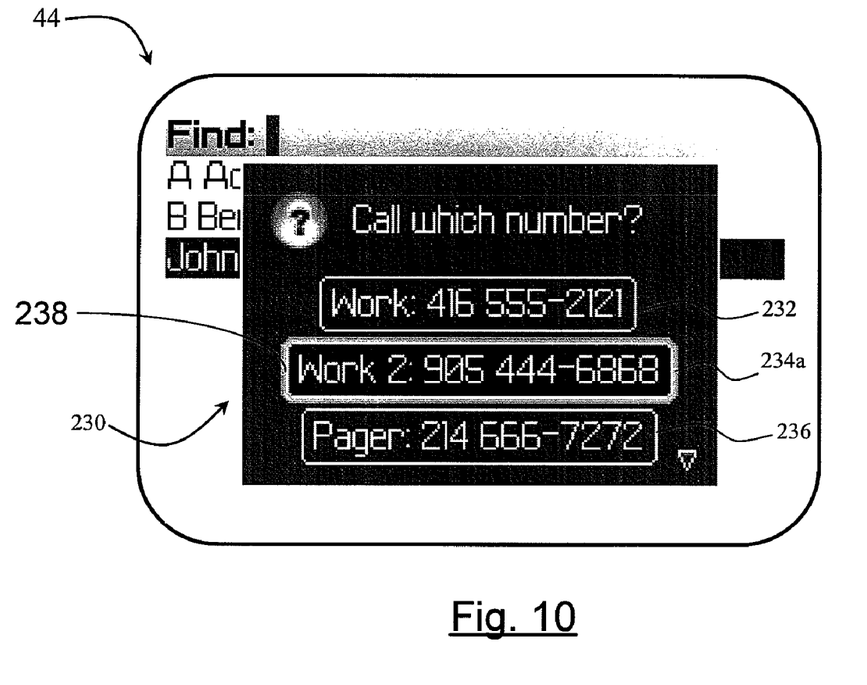
FIG. 10 shows a diagrammatic view of a menu with a phone contact option field highlighted.

By way of example, FIG. 10 shows a possible user interface call options window 230 displayed on device display screen 44 in response to user selection of the "Call John Smith" function 124 shown in FIG. 6. The call options window displays, based on the stored contact information for John Smith in the address book information 310, three different telephone number options, including a first work number option 232, a second work number option 234a and a pager number option 236. Again, a device user can, through rotation of scrollwheel 28a (or other suitable navigational input) move a selection symbol 238 through the options 232, 234a and 236 to selectively highlight one of the options so that it can then be selected by depressing the scrollwheel 28a (or pressing another suitable option selection key) to cause the device 10 to initiate a call through network 50 to the highlighted number. In example embodiments, when the call option window 230 is generated in respect of a highlighted contact, a check of the stored communication information 312 for the contact is performed to determine what telephone numbers are known for the contact and of those numbers, which was the last one that was used for calling the contact. The known numbers are then presented as options in the call option window 230, and the selection symbol 238 is automatically positioned to highlight the last used telephone number for the contact such that a call to that number can be easily initiated by selecting the highlighted option through depression of the scrollwheel 28a (or pressing another suitable selection key). In some embodiments, the telephone options displayed in the call option window 230 can be integrated in the options menu 106 instead of being displayed in a separate call option window.

Thus, it will be appreciated that for each contact name in the address book 310, various different communication transport mechanisms or methods can exist as options for communicating between the device and that contact name (for example, telephone and various electronic messaging transport methods such as SMS messaging, PIN messaging, Email). Furthermore, associated with each of the communication transport method options there can be a number of different possible address options (example, multiple phone numbers for telephone calls or SMS messaging, multiple email address for email). In at least one example embodiment, when a contact name is selected from an address book list, an option menu 106 is generated listing different user selectable communications options (120, 122, 124, 126) for communicating with the selected contact name, with the communications transport method option that was last used being focused or highlighted with a selection indicator 118 as the default communication option. In at least some example embodiments, all or at least some of the communications options listed in the option menu 106 are communication transport method options, and at least some of the transport method options each have multiple associated address options. In order to facilitate user selection of the multiple address options, when a transport method option is selected from the options menu 106, an address option selection menu (see for example menus 150, 160, 230) is generated listing user selectable address options to be used for the selected transport method. The address that was last used for communicating with the selected contact using the selected transport method is focused or highlighted with a selection indicator 152, 162, 238 as the default address. In some embodiments, where there is no "last used" communication transport method or address information available for a selected contact name, the device can be preconfigured to select a default option to highlight based on other preconfigured criteria.

Turning again to FIG. 6, as indicated above, the user can move the onscreen selection indicator 118 to highlight and then select a different communications method option other than the default option. For example, in the illustrated embodiment, the last used communication method for communicating with contact John Smith was email, and accordingly the "Email John Smith" communications method option 120 is highlighted as the default option when the option menu 106 is initially generated. However, the user has the option to slect a different option, for example the "Call John Smith" option 124, in which case the phone number selection menu 238 of FIG. 10 is generated, with the last used telephone number for John Smith highlighted by selection symbol 238 as the default telephone number. Accordingly, in at least some example embodiments, when an options screen displaying multiple selectable addresses for a selected communications method are displayed, the address most recently used for the selected communications method for the subject client name is highlighted as the default address even when the selected communications method itself was not most recently used communications method.

In some example embodiments, the last used communication transport method and the addresses last used for each of the transport methods that are tracked for the each of the client users are the method/address that were last used in communications that were initiated by the mobile device 10. In other words, when selecting what is the last used communications method that should be highlighted as the default option in option menu 106 and what is the last used address that should be highlighted as the default option in address election menus 150, 160, 238, only outgoing communications initiated by the mobile device 10 are considered and the addresses/communications methods used in incoming communications from the selected contact name are irrelevant. For example, in the situation where the user of mobile device emailed John Smith but then subsequently received an incoming SMS message from John Smith, the next time that the options menu 106 was displayed for John Smith the communication method that would be highlighted in options menu 106 would be the email option 120 (the last used communication method for communications initiated by the mobile device 10 to John Smith).

However, in at least some example embodiments, the relevant historic communication information 312 that is tracked for contact names in the address book 310 can also include the last address/communication method used by the contact name for incoming communications, such that when selecting what is the last used communications method that should be highlighted as the default option in option menu 106 and what is the last used address that should be highlighted as the default option in address election menus 150, 160, 238, the most recent communication method/address used in any communication with the selected contact name (incoming or outgoing) is highlighted as the default. For example, in the situation where the user of mobile device emailed John Smith but then subsequently received an incoming phone call from John Smith's work 2 number, the next time that the options menu 106 was displayed for John Smith the default communication method that would be highlighted in options menu 106 would be the Call option 124 (the last used communication method for any communications between the mobile device 10 and John Smith), and if the Call option was selected, the highlighted telephone number in the address selection screen 230 would be John Smith's work 2 number (the last used phone address for the last phone communication between the mobile device 10 and John Smith). By way of another example, if an email communication is sent from the mobile device 10 to the contact John Smith at his email address1 (Jsmith@rim.com), and John Smith subsequently replies from his email address2 (Jsmith@rogers.com) (both of which are addresses that are associated with John Smith in address book 310), the next time that email is selected as the communication method for contacting John Smith and the email address options window 150 (FIG. 8) is generated, the default address that will be highlighted by selection symbol 152 is email address2 (Jsmith@rogers.com) (the last email address used in an email communication between the device 10 and John Smith).

In some embodiments, whether the last communication method/addresses that are used as the default are the last method/addresses used for only outgoing communications initiated by the device 10, or whether the last communication method/addresses that are used as the default are the last method/addresses used for either of outgoing communications initiated by the device 10 or incoming communications received by the device 10 is a user configurable option. In some configurations, such option can be set for individual contact names, and even for the addresses used for the transport methods.

Turning again to FIG. 6, in the situation where the device user elects to use a different communication option than was previously used for the highlighted contact 78, then the stored transport method information 312 is updated for that contact accordingly. Similarly, in the case of a telephone call, if a telephone call is made to a contact using a number option that was different from that last used for the contact, then the stored transport method information 312 is updated accordingly.

In some example embodiments, when tracking the communication option used for previous communications with a contact, the processor 38 is configured to only consider what transport method was last used for electronic messaging to the highlighted contact, and to ignore telephone communications, such that when generating the options menu 106 the last used one of the electronic messaging functions (Email 120, PIN 122, SMS 126) for the contact will be highlighted by selection indicator 128 regardless of whether the most recent communication to the contact was through voice telephone. In at least some such configurations, the actual telephone number used for the contact is still tracked in transport information 312 so that phone options menu 230 can be generated with the last used number highlighted in the event that the user selects the Call function 124 from options menu 106.

In the embodiment described above, the user interface of FIG. 5 showing the list of names 76 stored in address book information 310 has been generated in response to user activation of a hot key when viewing the messages list 70 of FIG. 4. However, the user interface methods described above need not be limited to situations where the address book list 76 is displayed in response to activation of a hot key. For example, the home screen for the device 10 as shown in FIG. 3 could include a "compose" icon 67, selection of which would launch a user interface screen similar to that shown in FIG. 5 which included a list of contact names that the methods described above could be performed in respect of. Similarly, selection of the "address book" icon 64a and/or phone icon 62 could in some embodiments launch a user interface screen similar to that shown in FIG. 5 which included a list of contact names that the methods described above could be performed in respect of. Furthermore, the address selection windows 150, 160, 238 can in some embodiments be reached through a sequence of user activities that vary from the sequences described above—for example, the device user may first select a compose email option before selecting the contact name to use as the addressee, and then select the contact name, resulting in generation of the email address option window 150 being generated in respect of the selected contact name with the last used email address for the contact name being highlighted as the default email address.

In at least some embodiments, the device 10 can be configured by a user to always highlight a default communications method option, regardless of the last communications method that was used. In some embodiments, the default can be globally set, and/or set for selected contact names or groups of contacts.

While the invention has been described in detail in the foregoing specification, it will be understood by those skilled in the art that variations may be made without departing from the scope of the invention, being limited only by the appended claims.

What is claimed is:

1. A method for selecting a communication option for communications from a mobile device which operates in a wireless communication network, the mobile device having access to stored address book information that includes contact names, the method comprising:
storing, in association with at least some of the contact names in the address book information, an indication of a last communication option used for communicating therewith;
displaying a list of user selectable contact names on a display of the mobile device;
after receiving input selection of one of the contact names from the list, causing a list of user selectable communication options for communicating with the selected contact name to be generated on the display, wherein at least some of the user selectable communication options are transport method options representing respective communication transport methods, used for communications between the mobile device and the selected contact name, and at least some of the transport method options have multiple associated address options;
automatically positioning a selection symbol on the display to highlight the selectable communication option that corresponds to a last communication option that was used for communicating with the selected contact name; and
after receiving input selection of one of the transport method options that has multiple associated address options, generating on the display a list of user selectable address options; and
automatically positioning a further selection symbol on the display to highlight the address option that corresponds to a last address that was used for communicating with the selected contact name.

2. The method of claim 1 wherein the transport method options include at least one of: an email option, a text messaging option, and a phone option.

3. The method of claim 1 wherein at least some of the user selectable communication options are selectable address options for communicating with the selected contact name using a specified communication transport method, wherein the last communication option that was used for communicating with the selected contact name corresponds to the last address used for communicating with the selected contact name using the specified communication transport method.

4. The method of claim 1 where the user selectable communication options include different selectable electronic messaging options for sending electronic messages to the selected contact name, the method including, after receiving a predetermined user selection input while one of the electronic messaging options is highlighted, generating a compose message user interface screen on the display prompting the device user to compose an electronic message for sending to the selected contact name using the communications option corresponding to the highlighted electronic messaging function.

5. The method of claim 4 including, after receiving the predetermined user selection input and before generating the compose message user interface screen, displaying a list of user selectable address options for the electronic messaging option that was highlighted, and automatically positioning a further selection symbol on the display to highlight the address option that corresponds to a last address that was used for communicating with the selected contact name using the electronic messaging option that was highlighted.

6. The method of claim 4 wherein the mobile device includes a rotatable and depressible input mechanism and including moving the selection symbol among the selectable communication options in response to rotation of the input mechanism, wherein the predetermined user selection input includes depression of the input mechanism.

7. The method of claim 1 wherein the user selectable communication options includes a phone option for initiating a telephone call over the wireless network to the selected contact name, the method including:
   storing for at least some of the contact names an indication of a telephone number last used for telephone communications therewith; and
   upon selection of the phone option, causing a list of user selectable phone numbers associated with the selected contact name to be generated on the display and automatically positioning a further selection symbol on the phone number that was last used for phone communications with the selected contact name.

8. The method of claim 7 including, upon receiving a predetermined user selection input, causing a telephone call to be initiated through the communications network to the phone number at which the selection symbol is positioned, and wherein the mobile device includes a rotatable and depressible input mechanism and including moving the selection symbol among the user selectable phone numbers in response to rotation of the input mechanism, wherein the predetermined user selection input includes depression of the input mechanism.

9. The method of claim 1 wherein the communication option that was last used for communicating with the selected contact name corresponds to the last communication option that was used for the last communication initiated by the mobile device to the selected contact name.

10. The method of claim 1 wherein the communication option that was last used for communicating with the selected contact name corresponds to the last communication option that was used for the last communication between the mobile device and the selected contact name regardless of whether the last communication was initiated by the mobile device or was initiated by the selected contact name.

11. A mobile device comprising:
   a controller including at least one processor;
   a wireless transceiver coupled to the controller for exchanging signals with a wireless communications network;
   a user input interface coupled to the controller for receiving user input;
   a storage coupled to the controller and for storing address book information identifying contact names and associated address information for the contact names; and
   a display coupled to the controller;
   the controller being operative to:
   store, in association with at least some of the contact names in the address book information, an indication of a last communication option used for communicating therewith;
   display a list of user selectable contact names on the display;
   after selection of one of the contact names from the list by a device user through the user input interface, cause (i) a list of user selectable communication options for communicating with the selected contact name to be generated on the display, and (ii) a selection symbol to be positioned on the display to highlight the selectable communication option that corresponds to a communication option that was last used for communicating with the selected contact name, wherein at least some of the user selectable communication options are transport method options for communications between the mobile device and the selected contact name, and at least some of the transport method options have multiple associated address options for communicating with the selected contact name; and
   after receiving input selection of one of the transport method options that has multiple associated address options, generate on the display a list of user selectable address options; and
   automatically position a further selection symbol on the display to highlight the address option that corresponds to a last address that was used for communicating with the selected contact name.

12. The device of claim 11 wherein the user selectable communication options include different selectable electronic messaging functions for sending electronic messages to the selected contact name, the controller being operative to, after receiving a predetermined user selection input while one of the electronic messaging functions is highlighted, generate a compose message user interface screen on the display prompting the device user to compose an electronic message for sending to the selected contact name using the communications option corresponding to the highlighted electronic messaging function.

13. The device of claim 12 wherein the selectable electronic messaging functions include at least one of an email function, and a text messaging function, and the mobile device includes a rotatable and depressible input mechanism and the controller is operative to move the selection symbol among the selectable communication options in response to rotation of the input mechanism, wherein the predetermined user selection input includes depression of the input mechanism.

14. The device of claim 11 wherein the user selectable communication options include a phone function for initiating a telephone call over the wireless network to the selected contact name, and the controller is operative to:
   store for at least some of the contact names an indication of a telephone number last used for telephone communications therewith; and
   upon selection of the phone function, cause a list of user selectable phone numbers associated with the selected contact name to be generated on the display and automatically positioning a further selection symbol on the phone number that was last used for communicating with the selected contact name.

15. The device of claim 11 wherein the mobile device includes a rotatable and depressible input mechanism and the controller is operative to move the selection symbol among the user selectable phone numbers in response to rotation of the input mechanism, and upon depression of the input mechanism initiate a telephone call to the phone number at which the selection symbol is positioned.

* * * * *